United States Patent
Harel et al.

(10) Patent No.: US 10,106,315 B2
(45) Date of Patent: Oct. 23, 2018

(54) FLEXIBLE INFLATABLE POLYHEDRON-SHAPED WATER TANK

(71) Applicants: EZ PACK WATER LTD, Savyon (IL); Alex Harel, Savion (IL); Shalom Green, Haifa (IL); Ohad Zecharia, Kibutz Shomrat (IL)

(72) Inventors: Alex Harel, Savion (IL); Shalom Green, Haifa (IL); Ohad Zecharia, Kibutz Shomrat (IL)

( * ) Notice: Subject to any disclaimer, the term of this patent is extended or adjusted under 35 U.S.C. 154(b) by 0 days.

(21) Appl. No.: 15/123,762

(22) PCT Filed: Mar. 22, 2015

(86) PCT No.: PCT/IL2015/050296
§ 371 (c)(1),
(2) Date: Sep. 6, 2016

(87) PCT Pub. No.: WO2016/151564
PCT Pub. Date: Sep. 29, 2016

(65) Prior Publication Data
US 2018/0002103 A1    Jan. 4, 2018

(51) Int. Cl.
*B65D 25/14* (2006.01)
*B65D 25/56* (2006.01)
*B65D 85/72* (2006.01)
*B65D 77/04* (2006.01)
*B65D 37/00* (2006.01)
*B65D 88/16* (2006.01)
*B65D 90/04* (2006.01)
*B65D 90/54* (2006.01)
*B65D 25/34* (2006.01)
*B65D 25/48* (2006.01)
(Continued)

(52) U.S. Cl.
CPC ............ *B65D 85/72* (2013.01); *B65D 25/14* (2013.01); *B65D 25/34* (2013.01); *B65D 25/48* (2013.01); *B65D 25/54* (2013.01); *B65D 25/56* (2013.01); *B65D 37/00* (2013.01); *B65D 77/04* (2013.01); *B65D 88/16* (2013.01); *B65D 90/046* (2013.01); *B65D 90/54* (2013.01); *C02F 1/30* (2013.01); *B65D 2590/046* (2013.01); *C02F 2307/02* (2013.01)

(58) Field of Classification Search
CPC ........ B65D 25/14; B65D 25/40; B65D 25/48; B65D 25/54; B65D 25/56; B65D 85/72
See application file for complete search history.

(56) References Cited

U.S. PATENT DOCUMENTS 3,370,774 A * 2/1968 Hopf .................... B65D 77/065
222/156
3,409,714 A 11/1968 Strugar, Jr.
(Continued)

FOREIGN PATENT DOCUMENTS

WO    WO 9805560    2/1998

*Primary Examiner* — Ryan A Reis

(57) ABSTRACT

A flexible and inflatable tank for the supply of potable water that is made of a strong, rigid and flexible material and is designed to incorporate a thin, flexible inner bag that is made of materials that comply with standards for the storage of potable water. The tank is made of a rectangular sheet, a pair of walls, and one or more openings and is shaped in general like a closed, round, oblate cylinder with two side walls.

1 Claim, 3 Drawing Sheets

(51) Int. Cl.
*B65D 25/54* (2006.01)
*C02F 1/30* (2006.01)

(56) References Cited

U.S. PATENT DOCUMENTS

| | | | | |
|---|---|---|---|---|
| 4,898,301 | A * | 2/1990 | Schick | B65D 75/5877 |
| | | | | 229/117.26 |
| 4,955,512 | A | 9/1990 | Sharples | |
| 5,037,002 | A * | 8/1991 | Tschanen | B65D 33/02 |
| | | | | 220/4.24 |
| 5,826,752 | A * | 10/1998 | Latimer | B65D 5/5405 |
| | | | | 222/105 |
| 6,286,700 | B1 * | 9/2001 | Davidson | B65D 77/065 |
| | | | | 220/1.6 |
| 6,378,733 | B1 * | 4/2002 | Boonzaier | B65D 5/103 |
| | | | | 220/630 |
| 6,478,182 | B2 * | 11/2002 | Karpisek | B65D 25/56 |
| | | | | 206/386 |
| 8,627,980 | B2 * | 1/2014 | Woodruff | A47K 3/001 |
| | | | | 220/495.03 |
| 2008/0000922 | A1 * | 1/2008 | Nevils | E03B 11/02 |
| | | | | 220/723 |
| 2011/0000918 | A1 * | 1/2011 | Plunkett | B65D 75/5877 |
| | | | | 220/495.06 |

* cited by examiner

FLEXIBLE INFLATABLE POLYHEDRON-SHAPED WATER TANK

TECHNICAL FIELD

The present invention refers both to a flexible, inflatable polyhedron water tank and to the manufacturing method of the said tank.

BACKGROUND ART

Various flexible and inflatable tanks for the supply of potable water are currently available. Such tanks are used mainly to supply potable water in cases of emergency in which the regular water supply has been disrupted and is not functioning, and to supply potable water to the public in outdoor situations such as during military exercises, park festivals and so on.

Such tanks as described above can have a volume of 500, 1,000, 2,000, 3,000, 5,000 liters, and possibly more, or less. They were developed primarily in order to streamline storage and transport and in most cases incorporate an inner, flexible and inflatable bag. The tank is made of a strong, rigid and flexible material such as PVC or a combination of PVC with other plastic materials or any other strong, rigid and flexible material (hereinafter referred to as "a strong, rigid and flexible material"). The inner bag is made from materials that comply with standards for the storage of potable water, and is usually made from a thin and flexible material, which is, as a result, susceptible to tearing.

The inner bag, which contains the water, is commonly inserted into the tank, while the tank provides a protective shell against tearing and damage. The inner bag is equipped with one or more spigots that are used both to fill the tank and to dispense the water. The tank is equipped with a small opening through which the inner bag is inserted and from which the said spigots protrude.

It is nowadays customary to manufacture the flexible, inflatable tank from an elongated rectangular sheet of a strong, rigid and flexible material, as mentioned above (hereinafter referred to as "the sheet"). The sheet is folded in two and stitched on the three open sides so as to form a flat, rectangular tank with two sides—top and bottom. A small piece is cut out of the side of the tank so as to create an opening through which the inner bag and spigot are inserted. The volume of the inner bag is customarily greater than that of the tank, so as to avoid creating excess pressure on the sides of the bag when it is full of water. When the inner bag is filled with water it "inflates" along with the tank until a kind of swollen rounded rectangular cube is formed. The present invention offers a flexible, inflatable tank with a different shape that streamlines its manufacturing and facilitates its use and manufacturing method.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

Figure 1:
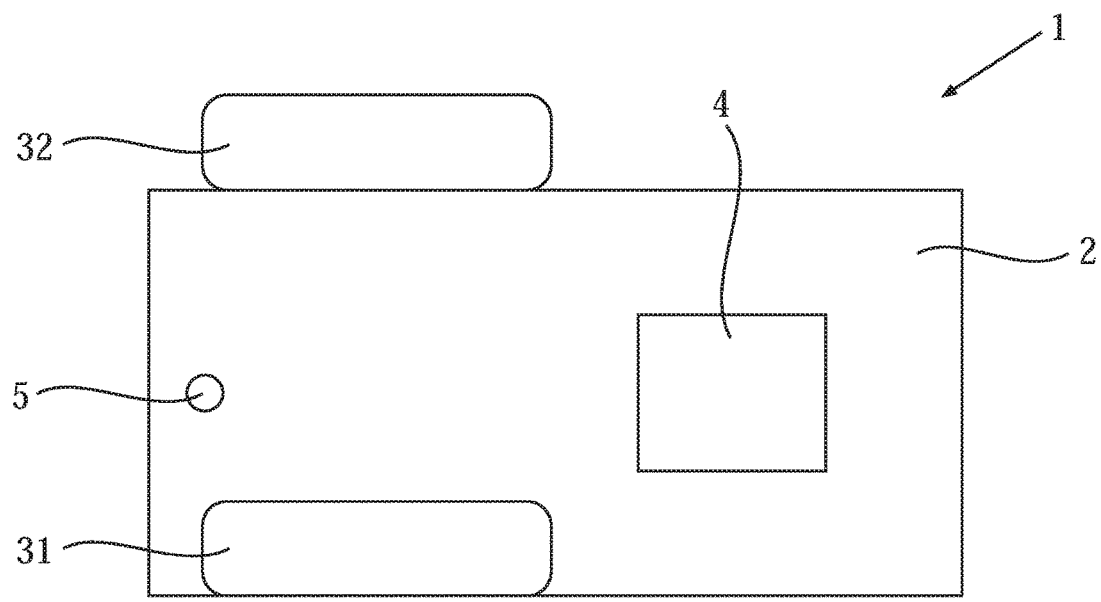
FIG. 1 presents a schematic representation of the tank (1), which includes a sheet (2), two side walls (31) (32) that are partially stitched to the sheet (2), one opening (5) for a spigot (11) and another opening (4) through which the inner bag is inserted into the tank (1).

The main objective of the present invention is to provide a flexible and inflatable polyhedron- shaped water tank that is designed to incorporate an inner bag that is made of materials that comply with standards for the storage of potable water. The inner bag is equipped with a spigot for filling the tank and with another spigot for dispensing water during use. Alternatively, one single spigot may be used for both purposes. The said tank has one or more openings through which the inner bag is inserted, one or two openings for the spigot(s), respectively, and an opening for the installation of a pressure relief valve when the inner bag is equipped with such.

The flexible, inflatable tank (1), subject of the present invention, comprises a rectangular sheet (2) and two side walls (31) (32). The rectangular sheet has one or more openings (4) designed to enable the user to insert the inner bag (10) into the tank (1). The rectangular sheet (2) also has one or more openings (5) used to install and access the filling and water dispensing spigot (11). The rectangular sheet (2) may also include an additional opening (6) for a pressure relief valve. The tank (1) should be compatible with the structure of the inner bag (10) that is to be inserted into it. The inner bag (10) may be equipped with one spigot (11) designed to be used both as a filling spigot as well as a dispensing spigot or it may be equipped with two spigots, one of which is used to fill the tank (111) and the other for dispensing water (112).

The opening (4) through which the inner bag (10) is inserted into the tank (1) is relatively large and is located on the upper side of the tank (1). As for the openings (5) intended for the connection of the said spigots: when the inner bag (10) is equipped with only one spigot (11), the opening (5) is located on the bottom of the tank (1); when the inner bag (10) is equipped with two spigots (111) (112) for filling and dispensing water, respectively, one opening (5) is located on the top and is designated for the filling spigot (111) and the second opening (5) is located on the bottom of the tank (1) and is designated for the water dispensing spigot (112). It is recommended that the two spigots be located at two opposite sides of the tank. When the tank (1) is equipped with an opening (6) for a pressure relief valve, it is located on the top of the tank (1). Alternatively, the openings may be located in the side walls (31) (32), according to the above principles.

The sheet (2) and side walls (31) (32) should be made of a strong, rigid and flexible material. The said material may be transparent and conduct light so as to enable the penetration of sun or artificial lighting required to activate a water purification mechanism which may be installed within the inner bag (10). In addition, the tank (1) may be equipped with a lighting system (8), such as a LED designed to activate a water purification mechanism that may be installed within the inner bag (10).

The tank (1) may be of a variety of shapes, determined primarily by the shape of the side walls (31) (32). Thus, for instance, if the side walls (31) (32) are elongated rectangles, the tank (1) will have the shape of a rectangular prism; if on the other hand the side walls (31) (32) are elongated ellipses or elongated rectangles with rounded sides, the tank (1) will have the shape of an oblate elliptical cylinder.

The manufacturing method of the tank (1) comprises the following stages: cutting out the sheet (2) and side walls (31) (32); stitching the side walls (31) (32) to the longitudinal sides of the sheet (2); stitching the sheet (2) to the side walls (31) (32) to form the tank (1). The stitching lines are indicated in FIG. 7.

The sheet (2) and/or one or both of the side walls (31) (32) include one or more of the openings (4) (5) (6).

FIG. 1 presents a schematic representation of the tank (1), which includes a sheet (2), two side walls (31) (32) that are partially stitched to the sheet (2), one opening (5) for a spigot (11) and another opening (4) through which the inner bag is inserted into the tank (1).

Figure 2:
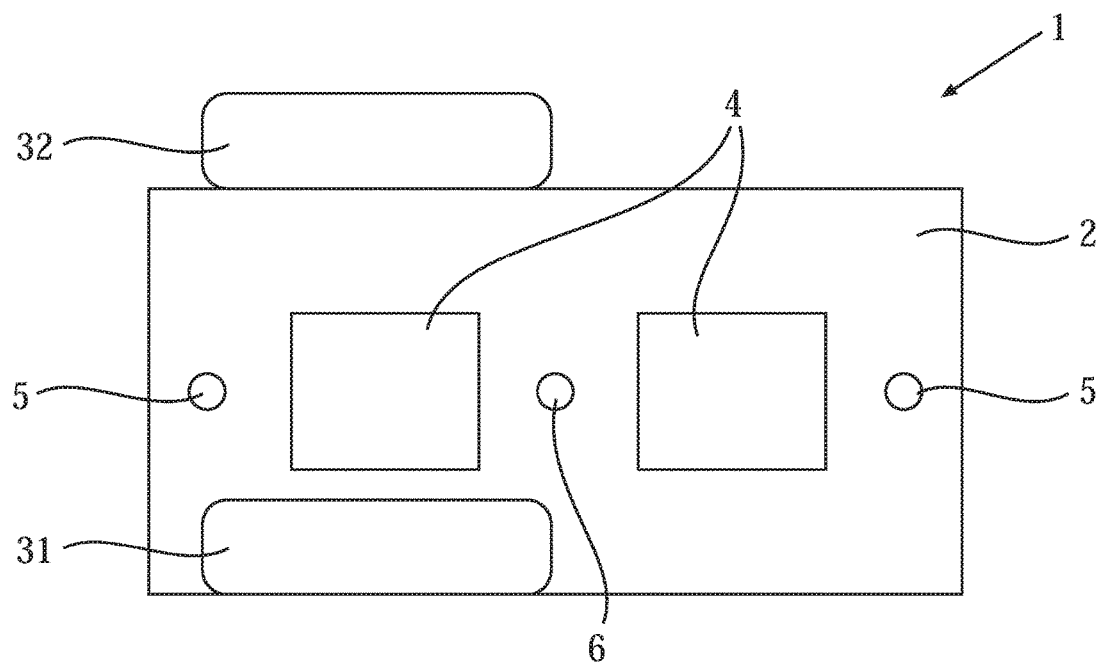
FIG. 2 presents a schematic representation of the tank (1), which includes a sheet (2), two side walls (31) (32) that are partially stitched to the sheet (2), two openings (5) for the filling spigot (111) and the water dispensing spigot (112), two openings through which the inner bag may be inserted into the tank (1), and one opening (6) for a pressure relief valve.
Figure 3:
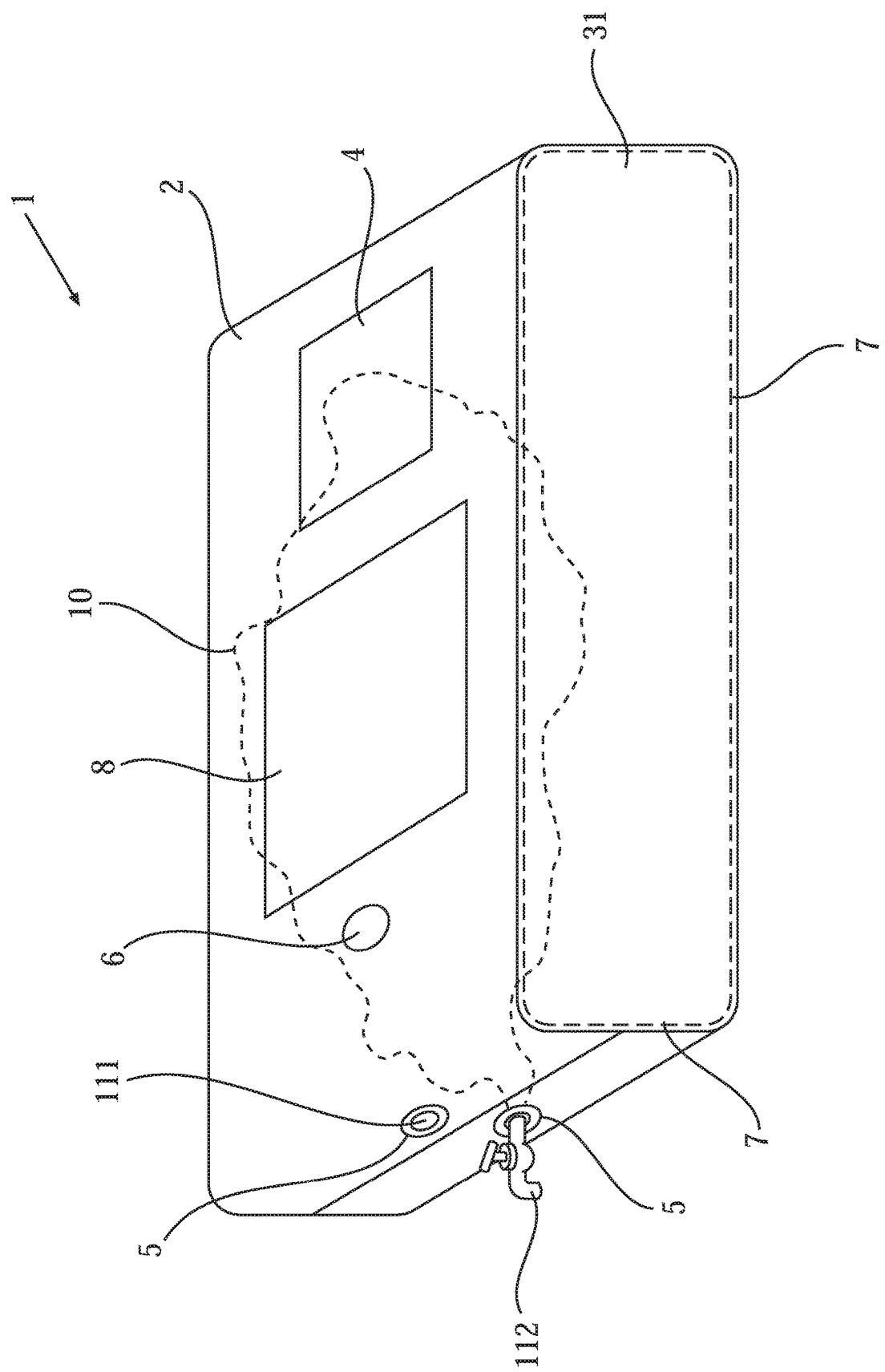
FIG. 3 depicts the tank (1), with its two sides sewn in place and with an illumination system (8), ready for use.

FIG. 2 presents a schematic representation of the tank (1), which includes a sheet (2), two sides (31) (32) that are partially stitched to the sheet (2), two openings (5) for the filling spigot (111) and the water dispensing spigot (112), respectively, two openings through which the inner bag is inserted into the tank (1), and one opening (6) for a pressure relief valve. FIG. 3 depicts the tank (1), with its two sides stitched in place and an illumination system (8), ready for use.

An innovative implementation of the present invention can refer to a flexible, inflatable tank (100) designed to replace plastic tanks or containers, about 20 liters in volume, used, among other things, by military forces to transport liquids such as water and vehicle fuel. It is clarified that military forces, and many other entities, customarily transport water and other liquids in plastic tanks, and it is customary to refer to such containers as jerry cans. The flexible, inflatable tank (100) can be a very effective substitute for such plastic containers.

Figure 4:
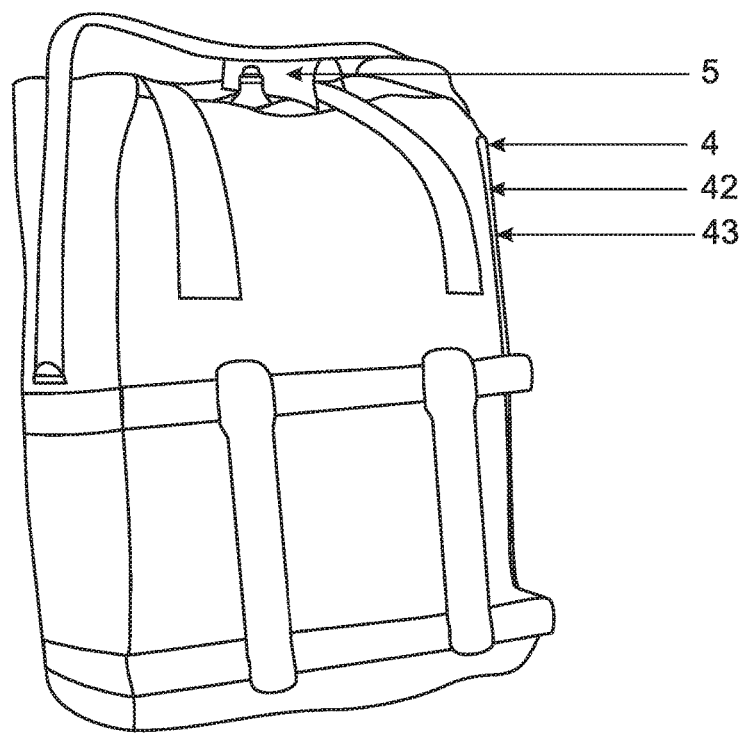
FIG. 4 depicts the full tank (100) assembled on a carrier.
Figure 5:
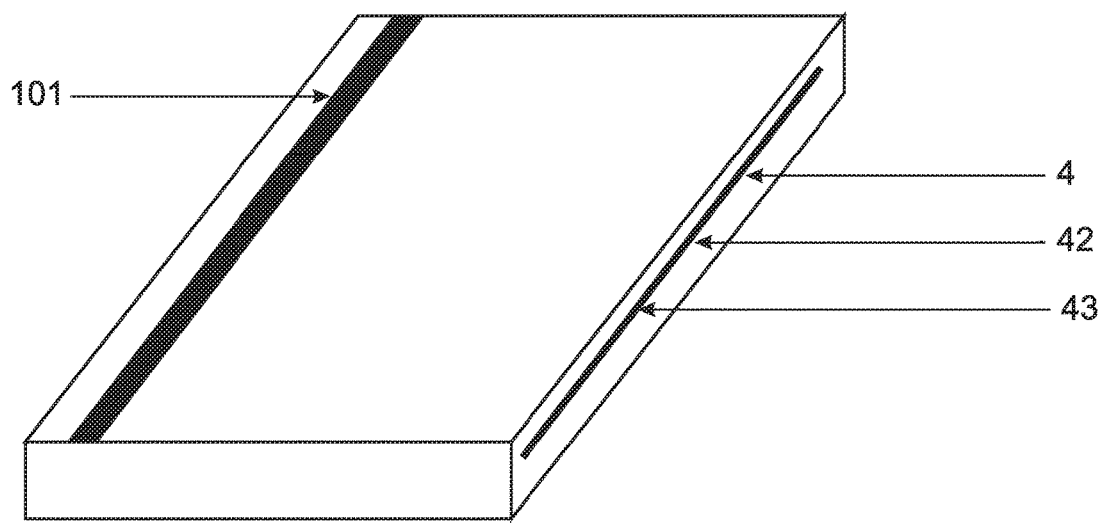
FIG. 5 presents a schematic representation of the tank (100) with a side opening (4) and a narrow, transparent segment (101) that enables the user to gauge the amount of water in the tank.

The flexible, inflatable tank (100) is made of a rectangular sheet (2) with two side walls (31) (32). The rectangular sheet has an elongated side opening (4) with a first closing means (41), such as a zipper. The side opening (4) is designed to enable the user to insert and replace the inner bag (10) according to need. The tank (100) is also equipped with the protective cover sheet (42) that covers the side opening (4) and the closing means (41). The protective cover sheet (42) has a second closing means (43), such as hook-and-loop (Velcro) fastener such that after the opening (4) is closed using the zipper (41), the zipper (41) is covered with the protective cover sheet (42) using the hook-and-loop fastener (43), which adheres to the side of the tank (100). This protects both the opening and closing means from damage and unintentional opening. The tank (100) has a top opening (5) designed to enable the user to connect and gain access to the filling and dispensing spigot (11) installed on the inner bag (10) which is inserted into the tank (100). In addition, the rectangular sheet (2) also has a narrow, transparent segment (101) running the entire length of one of the sides, that enables the user to gauge and see the amount of liquid in the tank (100). FIG. 4 depicts a full tank installed on a vehicle carrier and FIG. 5 is a schematic representation of the tank (100) showing the side opening (4) and the narrow, transparent segment (101) used to gauge and determine the amount of liquid in the tank (100).

What is claimed is:

1. A flexible and inflatable tank designed for the transportation of liquid, that is made of a flexible material and is designed to incorporate a flexible thin inner bag made of materials for the storage of potable water or for the transport of fuel; wherein the tank is made of a rectangular sheet, a pair of side walls, an elongated side opening designed for the insertion of the inner bag, and a top opening intended for a spigot that is installed on said inner bag; wherein the tank has the general shape of a polyhedron with said pair of side walls; wherein said elongated side opening is equipped with a first closing means; wherein said tank is equipped with a protective cover sheet that covers the elongated side opening; wherein the protective cover sheet is equipped with a second closing means; and wherein said rectangular sheet has an elongated, transparent segment running along the length of one of the tank sides that enables a user to determine the amount of liquid in the tank.

\* \* \* \* \*